UNITED STATES PATENT OFFICE.

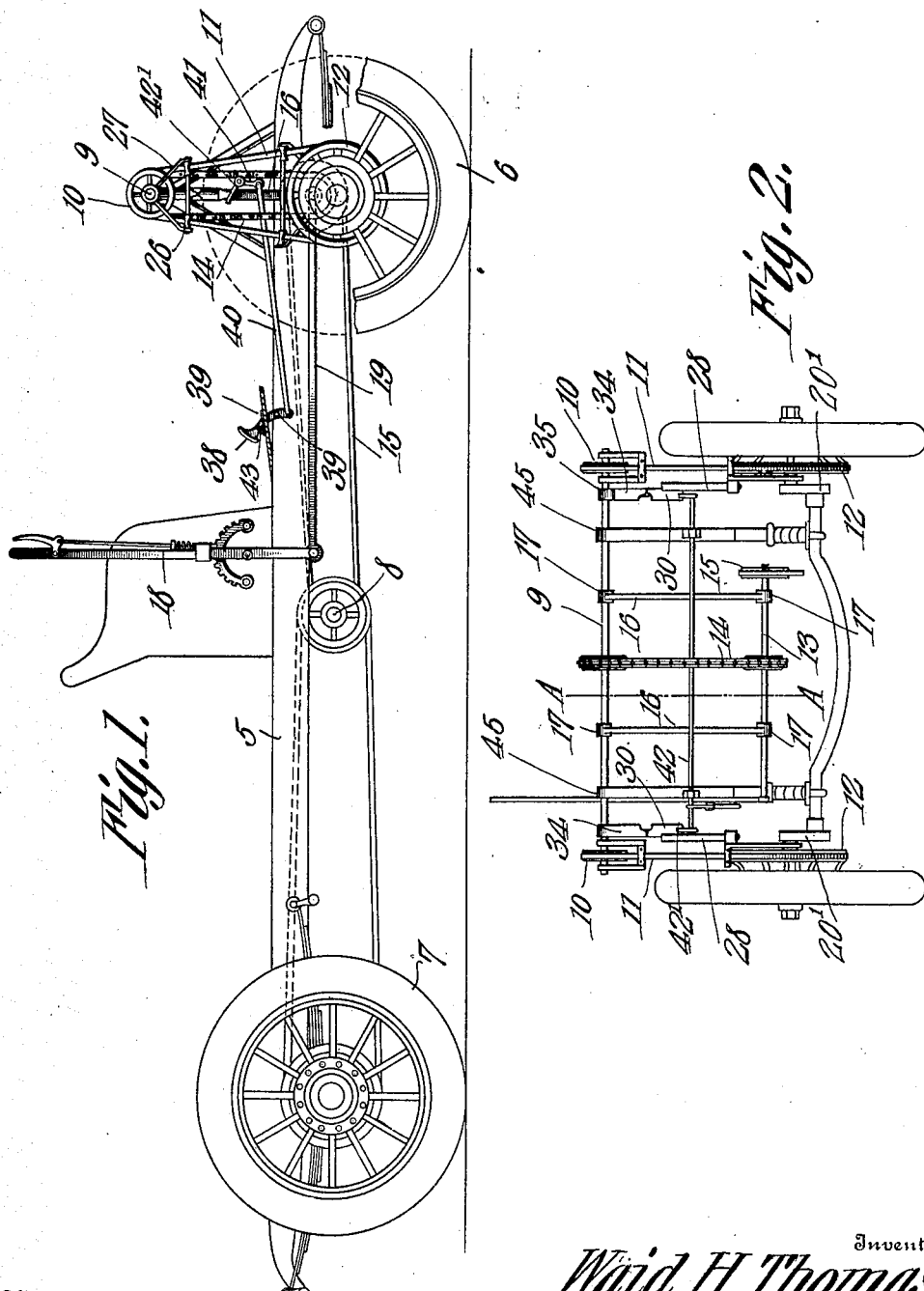

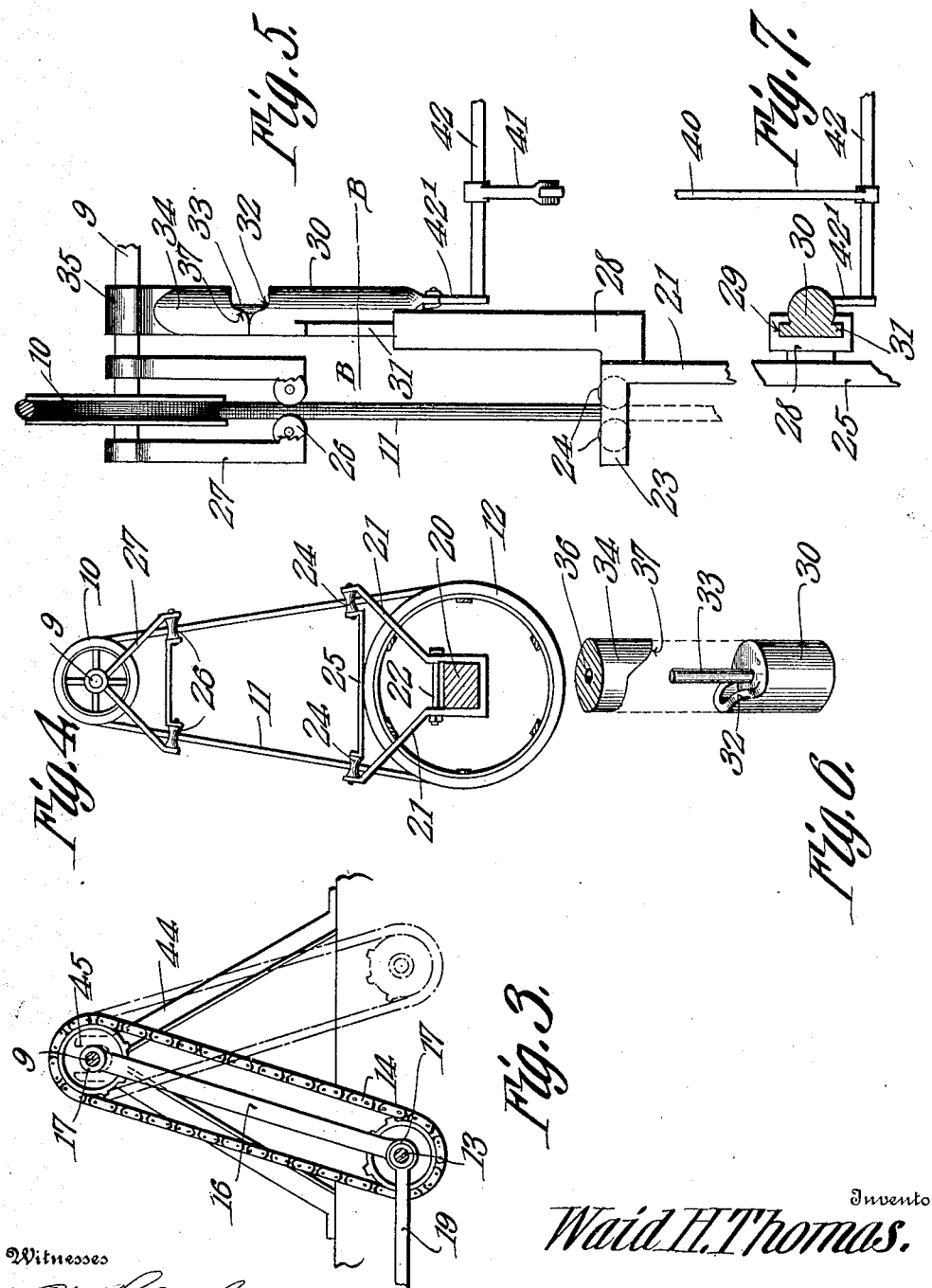

WAID H. THOMAS, OF TAYLOR, NORTH DAKOTA.

MOTOR-VEHICLE DRIVE-GEAR.

No. 916,224.          Specification of Letters Patent.      Patented March 23, 1909.

Application filed December 21, 1908. Serial No. 468,583.

*To all whom it may concern:*

Be it known that I, WAID H. THOMAS, a citizen of the United States, residing at Taylor, in the county of Stark and State of North Dakota, have invented a new and useful Motor-Vehicle Drive-Gear, of which the following is a specification.

This invention relates more particularly to the drive gear of motor vehicles, and has for its object to provide an improved front and rear drive, or in other words, to propel the vehicle from both axles.

A further object of the invention is to provide a drive gear of this kind which is simple in structure, and which can be readily applied to any ordinary motor vehicle or traction engine.

The invention also has for its object a novel arrangement of parts constituting the front drive, which will not interfere with the steering of the vehicle, and which will stay in gear irrespective of the position of the steering wheels.

Another object of the invention is to provide improved means for throwing the front drive out of gear, together with other novel features of construction, as will appear more fully hereinafter.

In the accompanying drawings:—Figure 1 is a side elevation of the chassis and running gear of a motor vehicle, showing the application of the invention. Fig. 2 is a front elevation thereof. Fig. 3 is a vertical section on the line A—A of Fig. 2. Fig. 4 is a side elevation of the belt guide. Fig. 5 is an enlarged front elevation of said belt guide. Fig. 6 is a detail in perspective. Fig. 7 is a horizontal section on the line B—B of Fig. 5.

Referring more particularly to the drawings, 5 denotes the chassis of the vehicle, and 6 and 7, the front and rear wheels, respectively. The rear wheels are driven in the usual manner from the drive shaft 8, by a sprocket and chain, or other suitable form of gearing. Near the front end of the vehicle is mounted a transverse counter-shaft 9 which projects a short distance from both sides thereof, and has mounted on said projecting ends, band-pulleys 10, which are connected by belts or cables 11, with similar pulleys 12 mounted on the hubs of the front wheels 6. The counter-shaft 9 is driven from a second counter-shaft 13 by means of a chain 14 passing over sprocket-wheels mounted on said shafts, and the shaft 13 is driven from the shaft 8 by a belt or cable 15 passing over a band-pulley on said shaft and a similar pulley on the shaft 13. The shaft 13 is supported by the shaft 9, it being carried by arms 16 provided with bearings 17 for the shaft 13. These arms are pivotally mounted on the shaft 9 for the purpose of enabling the shaft 13 to be swung in an arc having the shaft 9 for its center, whereby the cable 15 may be tightened or loosened to throw the shaft 13 into or out of gear. The shaft 13 is swung as stated, by means of a hand lever 18, fulcrumed on one side of the vehicle body, and connected by a link 19 with the shaft. The lever 18 is provided with the usual latch and segment-rack for locking the same.

In order to prevent the cable 11 from slipping off the pulleys 10 and 12, when the front wheels are turned to steer the vehicle, I provide a set of belt-guides for each of said cables, which guides I will now proceed to explain.

On the stub axle 20 of each front wheel is mounted a roller-carrying frame comprising a bar which is bent around the bottom and sides of said axle, and extended transversely therefrom in opposite directions, forming diverging arms 21. A transverse bolt 22 passes through the arms above the axle, whereby they are clamped thereto, and that portion of the axle on which the bar fits, is grooved to receive the same.

At the extremities of the arms are lateral extensions 23, carrying each a pair of rollers 24. The arms 21 extend outwardly sufficiently, so that one stretch of the cable 11 may pass between one pair of said rollers, and the other stretch of said belt between the other pair of rollers. The extremities of the arms are also connected and braced by a cross-bar 25. These rollers engage the belt above and adjacent to the pulley 12. Below and adjacent to the pulley 10, the belt is engaged by another set of guide rollers 26. The last mentioned guide rollers are carried by a triangular-shaped frame 27, which is hung on the shaft 9, it being provided at its apex with a bearing through which said shaft loosely passes. The last mentioned rollers engage the belt in the same manner as the rollers 24.

By providing the belt-guides adjacent to the pulleys 10 and 12, it will be seen that the front wheels can be swung around to steer the vehicle without danger of the belt slipping off said pulley.

Inasmuch as the cable 11 becomes tight when the front wheels are swung around to steer the vehicle, I provide means for automatically lowering the counter-shaft 9 to compensate for such tightening of the cable, whereby it is always retained at the proper driving tension.

To the cross-bar 25 is secured a bracket 28 formed with a vertical guide groove 29 in which is slidably mounted a stem 30, said stem having guide flanges 31 which fit in the groove. The upper end of the stem has a beveled surface 32, and from said stem projects a spindle 33 on which is mounted to slide up and down thereon, a shaft-supporting member 34, said member having at its upper end a bearing 35 in which the counter-shaft 9 is supported. The lower end of the member has a bore 36 to receive the spindle 33, and said end is also beveled as indicated at 37 to conform to the bevel 32. It will be seen that by reason of these two beveled surfaces, the member 34 will be raised or lowered when the stem 30 is rotated, said stem rotating when the front wheels are swung around to steer the vehicle, the stem being in axial alinement with the pivot or knuckle 20' of the stub axle 20. The beveled surfaces are arranged so that the member 30 lowers when the wheels are swung in either direction, and rises when the wheels are swung to straight position. The bevels are also so proportioned that the extent of the drop is proportionate to the extent of rotation of the stem 30, and as said stem turns with the stub axle, it will be seen that the cable 11 will be held at all times at proper tension. The member 34 is at its highest position when the wheels are straight, and the length of the cable is such that it engages with the pulleys 10 and 12 with the proper tension at this position of the member.

In order that the tension of the cable 11 may be adjusted if it should stretch, I provide a foot lever 38 which is pivoted at 39 to the frame of the vehicle within reach of the driver's foot, and is connected by a link 40 to an arm 41 made fast to and projecting from a rock shaft 42 mounted transversely at the front end of the vehicle. The rock shaft is connected by an arm 42' with the stem 30. By this system of levers, upon pressing down on the foot lever 38, the stem 30 will be elevated, this movement being guided by the ribs 31 working in the grooves 30 of the bracket 28, and it is held at that adjustment upon locking the foot lever 38, a suitable locking device 43 being provided for this purpose.

The counter-shaft 9 is also supported by braces 44 mounted on the frame of the vehicle, said braces having slotted bearings 45 for the counter-shaft, in order that it may be raised and lowered as described. Each of the cables 11 is provided with the herein described automatic tensioning device.

The invention herein described provides a simple and effectual front drive, which can be readily applied to the ordinary motor-vehicle, traction-engine or other self-propelled vehicle, and, by means of the swinging counter-shaft 13, the front wheels can be readily thrown into and out of gear.

What is claimed is:—

1. The combination with the drive-shaft and the steering-wheels of a motor vehicle; of a counter-shaft geared to the drive-shaft, pulleys on the counter-shaft, pulleys on the steering-wheels, belts connecting said pulleys, and belt-guides for said belts for retaining the same on the pulleys when the wheels are operated to steer the vehicle.

2. The combination with the drive-shaft and the steering-wheels of a motor vehicle; of a counter-shaft geared to the drive-shaft, pulleys on the counter-shaft and the steering-wheels, belts connecting the said pulleys, and belt-guides for retaining the said belts on the pulleys when the wheels are operated to steer the vehicle, said guides swinging with the wheels.

3. The combination with the drive-shaft and the steering-wheels of a motor vehicle; of a counter-shaft geared to the drive-shaft, pulleys on the counter-shaft and steering-wheels, belts connecting said pulleys, and guides for said belts engaging the same adjacent to the pulleys, one set of said guides being mounted to swing with the steering wheels.

4. The combination with the drive-shaft and the steering-wheels of a motor vehicle, of a counter-shaft geared to said steering-wheels, a swinging shaft carried by the counter-shaft, a flexible gearing between said shafts, and a flexible gearing between the drive-shaft and the swinging shaft.

5. The combination with the drive-shaft and the steering-wheels of a motor vehicle; of a vertically adjustable counter-shaft geared to the drive shaft, pulleys on the counter-shaft, pulleys on the steering-wheels, belts connecting said pulleys, belt-guides for said belts for retaining the same on the pulleys when the wheels are operated to steer the vehicle, means for automatically lowering the counter-shaft when the steering-wheels are swung side-wise, and for returning the counter-shaft when said wheels are swung to the straight position.

6. The combination with the drive-shaft and the steering-wheels of a motor vehicle, said steering-wheels being carried by pivoted stub axles; of a vertically adjustable counter-shaft geared to the drive-shaft, pulleys on the counter-shaft, pulleys on the steering-wheels, belts connecting said pulleys, belt-guides for said belts for retaining the same on the pulleys when the wheels are operated to steer the vehicle, stems carried by the stub axles in axial alinement with their pivots, supports for the counter-shaft mounted on said stems, and means for raising and lowering said supports when the stems are rotated.

7. The combination with the drive-shaft, and the steering-wheels of a motor vehicle, said steering wheels being carried by pivoted stub axles; of a vertically adjustable counter-shaft geared to the drive-shaft, pulleys on the counter-shaft, pulleys on the steering-wheels, belts connecting said pulleys, belt-guides for said belts for retaining the same on the pulleys when the wheels are operated to steer the vehicle, stems carried by the stub axles in axial alinement with their pivots, spindles rising from the stems, and shaft-supporting members mounted on the spindles to slide up and down thereon, the abutting ends of the stems and the members being beveled.

8. The combination with the drive shaft and the steering-wheels of a motor vehicle, said steering-wheels being carried by pivoted stub axles; of a vertically adjustable counter-shaft geared to the drive-shaft, pulleys on the counter-shaft, pulleys on the steering-wheels, belts connecting said pulleys, belt-guides for said belts for maintaining the same on the pulleys when the wheels are operated to steer the vehicle, stems carried by the stub axles in axial alinement with their pivots, means for vertically adjusting said stems, supports for the counter-shaft mounted on said stems, and means for raising and lowering said supports when the stems are rotated.

In testimony that I claim the foregoing as my own, I have hereto affixed my signature in the presence of two witnesses.

WAID H. THOMAS.

Witnesses:
J. COURTNEY,
TH. H. LARSEN.